United States Patent
Abdollahi Vayghan et al.

(10) Patent No.: US 11,627,056 B2
(45) Date of Patent: Apr. 11, 2023

(54) STATE CONTROLLER RUNNING IN A KUBERNETES SYSTEM AND METHOD FOR OPERATING SAME

(71) Applicants: Leila Abdollahi Vayghan, Verdun (CA); Mohamed Aymen Saied, Lévis (CA); Maria Toeroe, Montreal (CA); Ferhat Khendek, Montreal (CA)

(72) Inventors: Leila Abdollahi Vayghan, Verdun (CA); Mohamed Aymen Saied, Lévis (CA); Maria Toeroe, Montreal (CA); Ferhat Khendek, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/424,218

(22) PCT Filed: Jan. 24, 2019

(86) PCT No.: PCT/IB2019/050611
§ 371 (c)(1),
(2) Date: Jul. 20, 2021

(87) PCT Pub. No.: WO2020/152503
PCT Pub. Date: Jul. 30, 2020

(65) Prior Publication Data
US 2022/0116285 A1    Apr. 14, 2022

(51) Int. Cl.
*H04L 41/5009* (2022.01)
(52) U.S. Cl.
CPC .................. *H04L 41/5012* (2013.01)

(58) Field of Classification Search
None
See application file for complete search history.

(56) References Cited

U.S. PATENT DOCUMENTS

| | | | |
|---|---|---|---|
| 11,321,200 B1* | 5/2022 | Ter-Zakhariants | ............... H04L 12/2801 |
| 2007/0150613 A1* | 6/2007 | Lobig | ............... H04L 43/00 709/238 |
| 2008/0120177 A1* | 5/2008 | Moscirella | ............... H04L 41/082 714/2 |

(Continued)

FOREIGN PATENT DOCUMENTS

WO    2018162970 A1    9/2018

OTHER PUBLICATIONS

ETSI, SmartM2M; Landscape for open source and standards for cloud native software applicable for a Virtualized IoT service layer, TR 103 528 V1.1.1 (Aug. 2018).

(Continued)

*Primary Examiner* — Joshua Joo
(74) *Attorney, Agent, or Firm* — Julie Dufort; Ericsson Canada Inc.

(57) ABSTRACT

The disclosure relates to a method and a state controller running in a Kubernetes system. The state controller being operative to assign labels to pods, the labels indicating services to which the pods are assigned and high-availability states of the pods; detect a failed pod having a label indicating a high-availability state of not ready; and reassign the label indicating the high-availability state of the failed pod to a healthy pod, thereby changing endpoints of services provided and service flows from the failed pod to the healthy pod.

23 Claims, 10 Drawing Sheets

(56) References Cited

U.S. PATENT DOCUMENTS

| | | | | |
|---|---|---|---|---|
| 2013/0046731 A1* | 2/2013 | Ghosh | ............... | G06F 11/2097 |
| | | | | 707/622 |
| 2017/0220436 A1* | 8/2017 | Vogel | ................... | G06F 13/362 |
| 2018/0167487 A1* | 6/2018 | Vyas | ................... | G06F 9/5027 |
| 2018/0375936 A1* | 12/2018 | Chirammal | ........... | H04L 67/322 |
| 2019/0361618 A1* | 11/2019 | Avraham | .............. | G06F 3/0631 |
| 2020/0186422 A1* | 6/2020 | Fildebrandt | ......... | H04L 41/0846 |
| 2021/0036951 A1* | 2/2021 | Heron | ................... | H04L 45/22 |

OTHER PUBLICATIONS

K. Hightower et al., Kubernetes Up & Running, O'Reilly Media 2017.
Kubernetes, Deployments, https://kubernetes.io/docs/concepts/workloads/controllers/deployment/, Nov. 7, 2018.
Kubernetes, StatefulSets, https://kubernetes.io/docs/concepts/workloads/controllers/statefulset/, Nov. 7, 2018.
L. A. Vayghan et al., Kubernetes as an Availability Manager for Microservice Applications, Jan. 15, 2019, arxiv.org, Cornell University Library, XP081002823.
P. Heidari et al., QoS Assurance with Light Virtualization—A Survey, 2016 IEEE International Conference on Cloud Computing Technology and Science (Cloudcom), IEEE 2016.
ISR and Written Opinion from corresponding application PCT/IB2019/050611, dated Sep. 30, 2019, 16 pages.

\* cited by examiner

STATE CONTROLLER RUNNING IN A KUBERNETES SYSTEM AND METHOD FOR OPERATING SAME

TECHNICAL FIELD

The present disclosure relates to network function virtualization and to a state controller running in a Kubernetes system and a method for operating same.

BACKGROUND

Kubernetes is an open-source platform that enables the automated deployment and management of containerized applications. It has become a popular platform for deploying microservice based applications. Reference is made to kubernetes.io for a detailed description of Kubernetes and of its components.

The Kubernetes cluster has a master-slave architecture. The master coordinates the cluster and hosts processes that maintain the desired cluster state. The slave nodes, referred to as nodes, run the processes necessary to host application containers and communicate with the master. A pod is the smallest unit that Kubernetes deploys and maintains. A pod is a group of one or more containers that share the pod's IP address and its port space. In practice, microservice based applications are containerized and deployed on a Kubernetes cluster as pods.

The manager entities of Kubernetes are the controllers. They create and maintain the required number of pods based on the associated deployment specification. Controllers continuously work on bringing the state of the cluster to the desired state. For example, if a node hosting a pod crashes, the pod's controller reschedules the pod on another node. Kubernetes has different types of controllers each addressing a specific purpose. For example, StatefulSet controllers manage stateful applications while Deployment controllers are typically used for managing stateless applications.

Controllers delete and revive pods dynamically which in turn cause the pods' IP addresses to change often. Therefore, one cannot rely on the pods' IP addresses for communication. Instead, it is possible to assign customizable labels to pods to group and query them based on these labels. Kubernetes also defines an abstraction called a Service, which groups pods based on their labels. Pods that a service selects based on their labels are referred to as the service endpoints. Services have static virtual IP addresses. All requests received at the IP address of a service are load balanced between the service endpoints in a random or round robin manner.

Kubernetes also abstracts from the details of storage solutions by providing two API resources: the Persistent Volumes (PV) and Persistent Volume Claims (PVC). A PV is a piece of storage in the cluster whose lifecycle is independent from that of the pod using it. PVs can be provisioned dynamically or statically. A PVC on the other hand is a request for some storage made by a pod. A PVC binds the pod to a PV matching the PVC characteristics.

Service availability is measured as the percentage of time a service is accessible in a given period. It is a non-functional requirement that defines the acceptable service outage in a period of time.

To achieve service availability, Kubernetes provides healing for the applications it manages. This means that failed pods are restarted, while pods whose hosts fail are rescheduled on another host. In either case, when the failure is detected, the pods are removed from their respective service endpoints lists and they are added back when they become healthy again.

For stateless microservice based applications, this healing mechanism means that as soon as an unhealthy pod is removed from the service endpoints list it stops participating in the distribution of incoming requests, which are distributed among the remaining service endpoints representing healthy pods. Thus, service availability is improved.

Referring to FIG. 1, for example, the microservice 5 based application is composed of two pods 10a and 10b, generally 10, deployed on Node 1 11a and Node 2 11b. They are composing a Deployment 7 maintained by a Deployment controller 20 running on the Master node 15. The service "myService" shown in FIG. 1 exposes the pods 10 according to their selector labels "app: myApp". That is, pods 10 that have the label "app: myApp", i.e. PodA 10a and PodB 10b, become the service endpoints of the "myService" service 5. Thus, requests received by this "myService" service are load balanced between PodA and PodB. If PodA 10a fails, Kubernetes removes it from the endpoints list of the "myService" service 5 to avoid directing requests to the failed pod. In the meantime, the Deployment controller 20 restarts PodA so that the required number of pod replicas (i.e. 2) is maintained. If the cause of failure is a failure of Node 1, PodA is rescheduled on Node 2.

For stateful microservice based applications, Kubernetes provides different solutions, but, in any case, the assumption is that the state information is stored on a persistent storage managed outside of Kubernetes.

FIG. 2, also illustrates a possible deployment of stateful microservice 5 based applications with Deployment controller 20. In this case the PVC 35 (i.e. PVC-1), which is bound to a PV 30 (i.e. PV1) is associated with the Deployment 7, i.e. all the pods 10 in the deployment 7 share the access to the PV 30. Thus, if a pod fails, other pods 10 can access its data stored on the PV 30 provided they know where it is stored. Referring to FIG. 3, the most common way of deploying stateful applications with Kubernetes is by using StatefulSets 9 maintained by a StatefulSet controller 25 running on the Master node 15. In a StatefulSet, a PVC 35a, 35b is created for each pod 10 (e.g. PVC-1 and PVC-2), which then binds the pod to a dedicated PV 30a, 30b (i.e. to PV1 and PV2 respectively). This means that the data a pod stores in its PV is not shared with other pods of the StatefulSet. Moreover, if a pod of a StatefulSet fails, its data cannot be accessed until the failed pod is restarted with the same identity.

SUMMARY

There is provided a state controller running in a Kubernetes system. The state controller being operative to assign labels to pods, the labels indicating services to which the pods are assigned and high-availability states of the pods; detect a failed pod having a label indicating a high-availability state of not ready; and reassign the label indicating the high-availability state of the failed pod to a healthy pod, thereby changing endpoints of services provided and service flows from the failed pod to the healthy pod.

There is provided a method for operating a state controller. The method comprises assigning labels to pods, the labels indicating services to which the pods are assigned and high-availability states of the pods; detecting a failed pod having a label indicating a high-availability state of not ready; and reassigning the label indicating the high-availability state of the failed pod to a healthy pod, thereby changing endpoints of services provided and service flows from the failed pod to the healthy pod.

There is provided a non-transitory computer readable media having stored thereon instructions for operating a state controller, the instructions comprising the steps of any one of the methods described herein.

The state controller and methods and provided herein present improvements to the way state controller and methods previously known in the art operate.

DETAILED DESCRIPTION

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions or simultaneously. Furthermore, in some illustrations, some blocks, functions or actions may be optional and may or may not be executed; these are generally illustrated with dashed lines.

Figure 1:
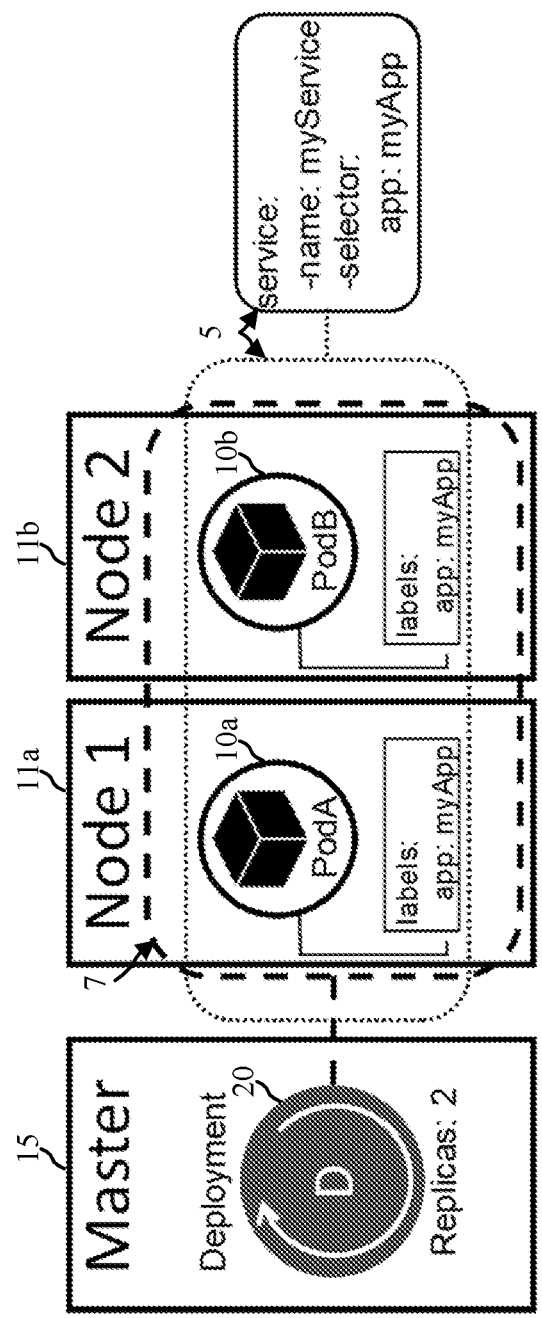
FIG. 1 is a schematic illustration of an example stateless application deployed with Kubernetes.
Figure 2:
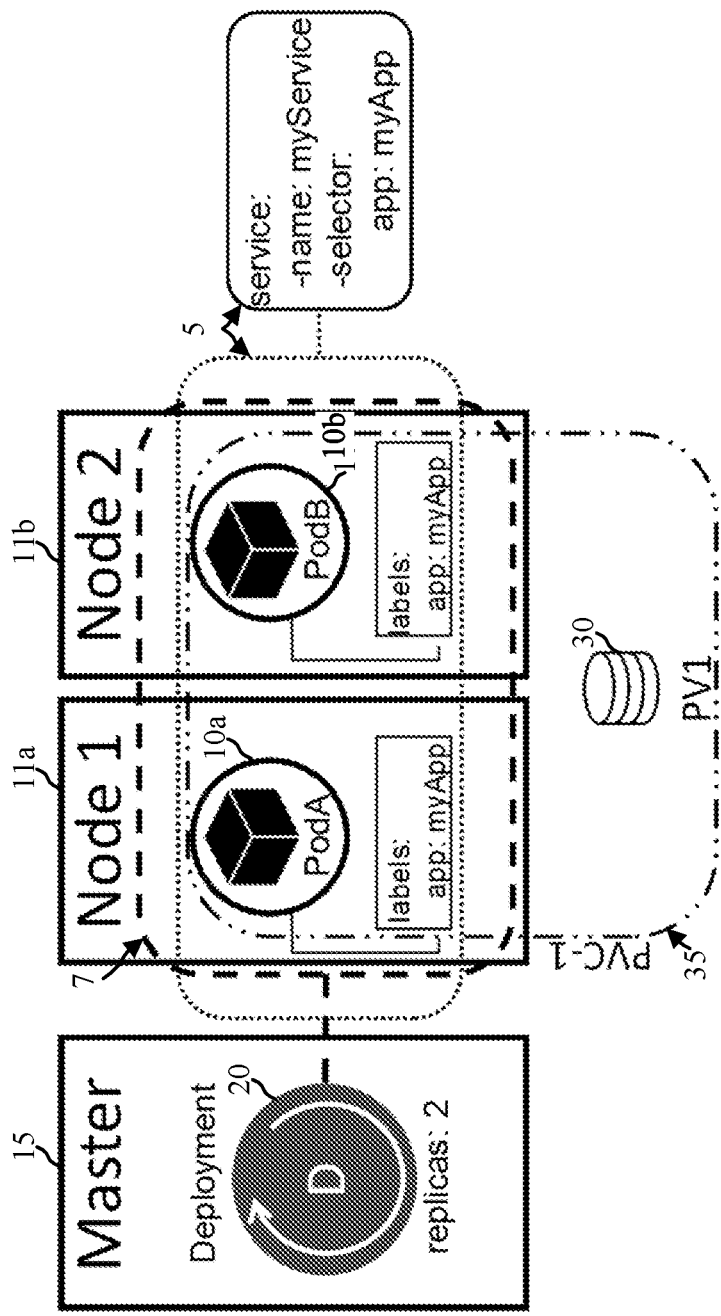
FIG. 2 is a schematic illustration of an example stateful application deployed with Deployment controller.

Referring again to FIG. 2, when a stateful microservice based application is deployed as a Deployment 7, all microservice instances have access to the same state data. However, if a pod fails, other pods 10 do not know about the failure, nor are aware of the location where its data is stored. Therefore, they will not recover the service that was provided by the failed pod. Since the identity of a restarted pod also changes, even the restart procedure cannot be relied on for recovering the stored service state.

Figure 3:
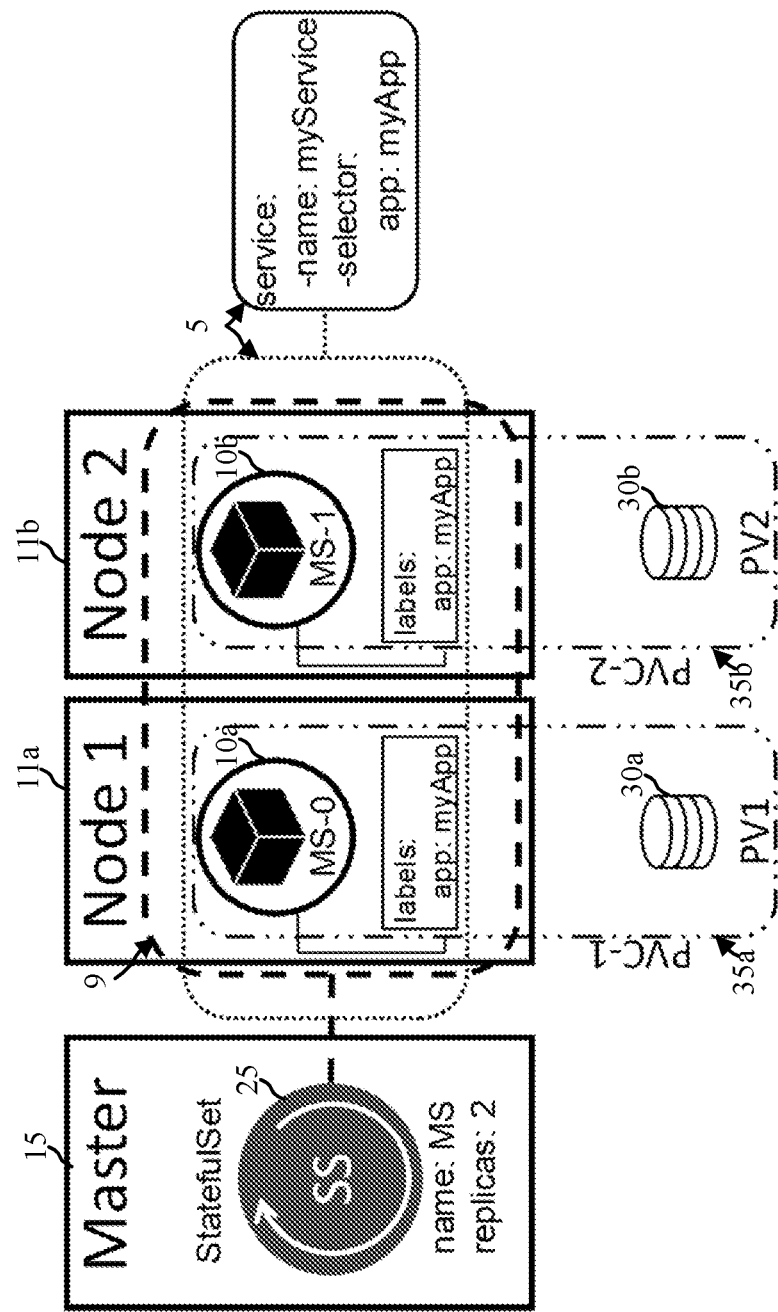
FIG. 3 is a schematic illustration of an example stateful application deployed with Stateful Set controller.

In case of a StatefulSet 9 shown in FIG. 3, if one pod fails, the others still would not know about the failure. However, since the pod is restarted with the same identity it can restore the state it had before the failure from the PV associated with the pod. This means that the service 5 can be recovered, but the clients need to wait for the failed pod to be restarted, which may be too slow for some applications.

In addition, to be able to containerize stateful applications, the applications need to be modified so that they store their state externally using a PV.

To overcome these limitations, it is therefore proposed to add a State Controller 50 component (FIG. 5) to Kubernetes in conjunction with secondary labels associated with the pods and their services. The secondary label of the pods determines the role the pods play within the set, whether they provide the service actively or serve as a standby. The secondary label of the services determines the endpoint of the flow for a request, i.e. it determines whether the request is delivered to the active pod, or to the standby pod for a service. For the latter, an internal service may be created with the same primary selector label as the service delivered and with the standby secondary label.

The State Controller component added to Kubernetes monitors the state of the available pods and manages the secondary label assigned to them. Should a failure occur it reassigns the labels to healthy pods as appropriate, which in turn change the endpoints of the services and therefore their flows.

For the healing capability, the State Controller relies on other Kubernetes controllers and it can be used together with either a Deployment controller or a Stateful Set controller.

Figure 4A:
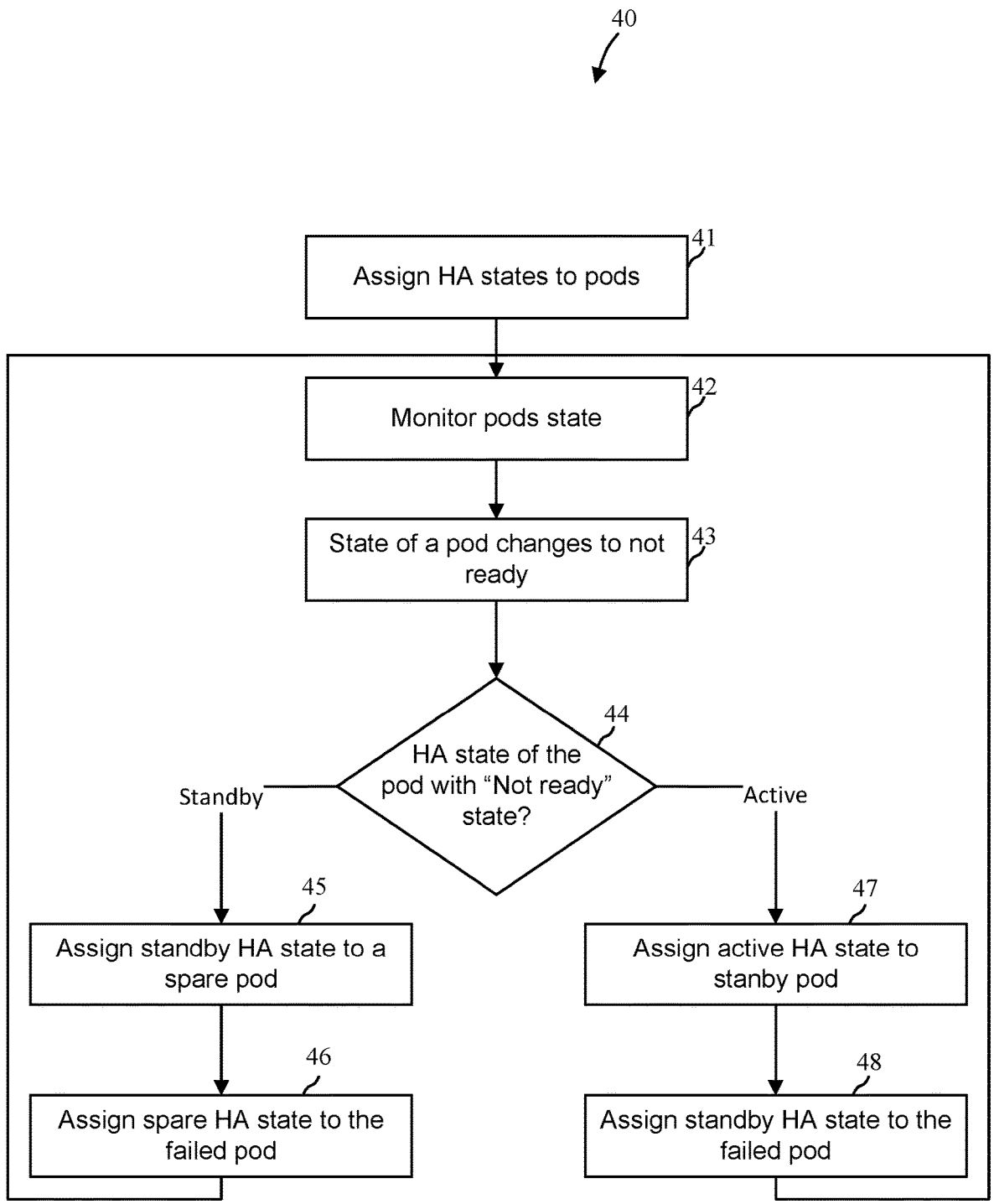
FIG. 4a is a flowchart of a method according to an embodiment.
Figure 5:
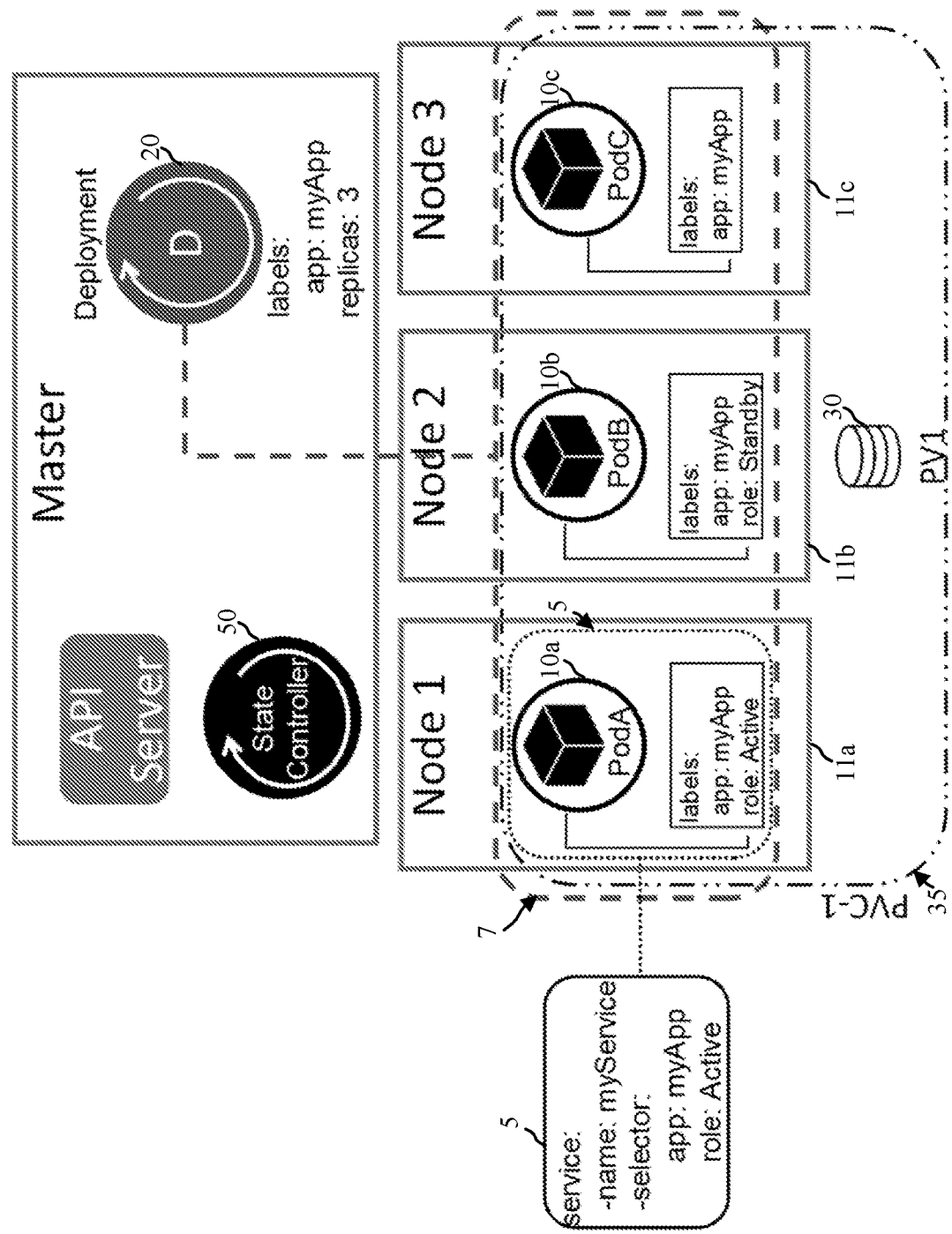
FIG. 5 is a schematic illustration of an example integrating a State Controller to manage the availability of stateful microservice based applications deployed by a Deployment controller.

FIG. 4a is a high-level flow chart 40 illustrating the operation of the State Controller 50 (FIG. 5). The State Controller 50 assigns the high-availability (HA) state to the pods 10, step 41, the HA state is represented by the secondary label "role" and can have the values active, standby or no value assigned. The State Controller 50 monitors the pods state, step 42, and detects when a pod's state changes to "not ready", step 43. Depending on the HA state of the pod which became "not ready", step 44, the State Controller 50 reassigns, step 45, the standby HA state to a healthy spare pod, and assigns, step 46, the spare state to the "not ready" pod; or reassigns, step 47, the active HA state to the standby pod and assigns, step 48, the standby HA state to the "not ready" pod. The State Controller then continues with the monitoring step 42.

Figure 4B:
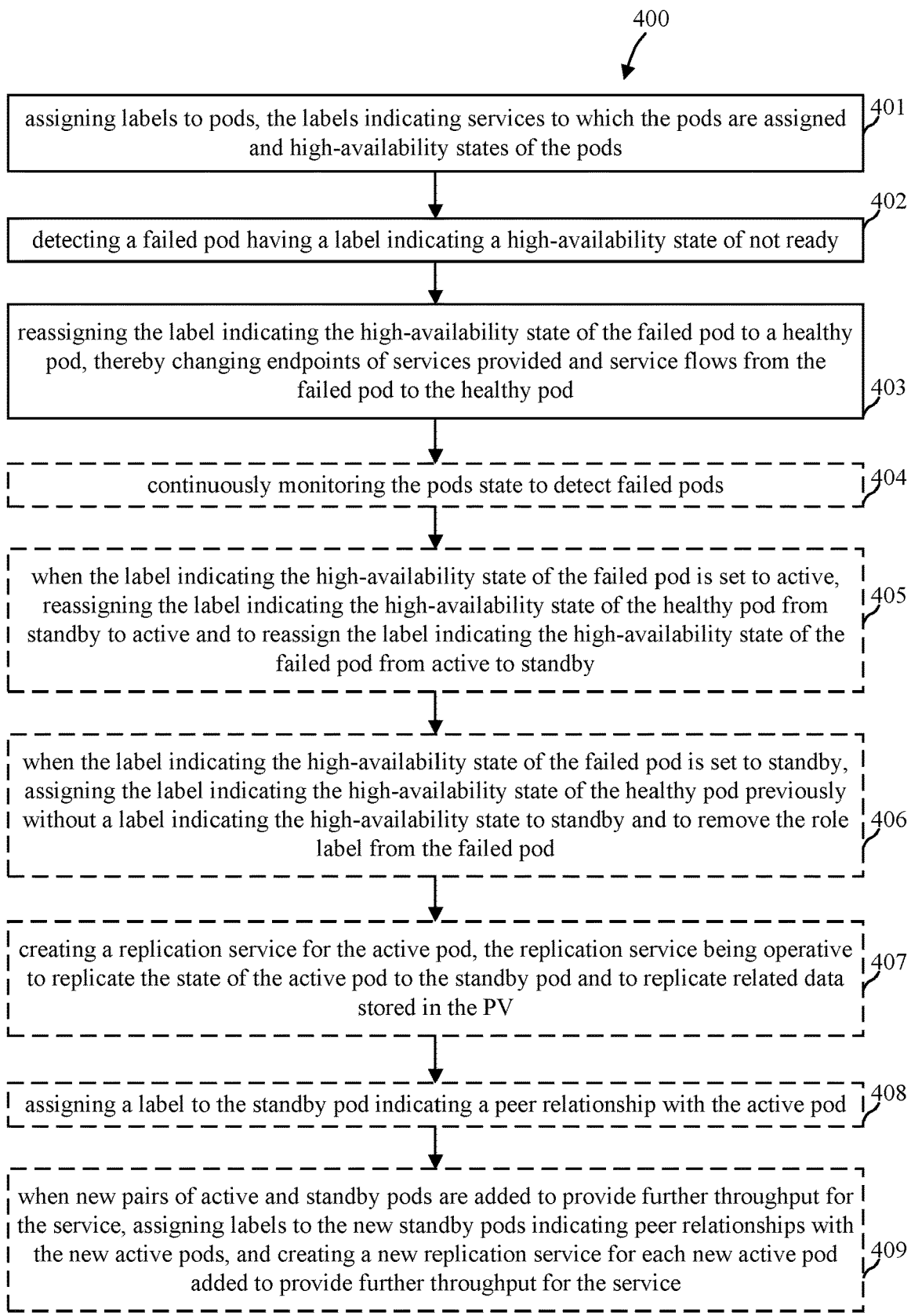
FIG. 4b is a flowchart of a method according to another embodiment.

The method for operating the state controller is also presented in relation with FIG. 4b. The method 400 comprises: assigning, step 401, labels to pods, the labels indicating services to which the pods are assigned and high-availability states of the pods; detecting, step 402, a failed pod having a label indicating a high-availability state of not ready; and reassigning, step 403, the label indicating the high-availability state of the failed pod to a healthy pod, thereby changing endpoints of services provided and service flows from the failed pod to the healthy pod.

The method may further comprise continuously monitoring, step 404, the pods state to detect failed pods. The method may further comprise, when the label indicating the high-availability state of the failed pod has a value indicative of an active state, reassigning, step 405, the label indicating the high-availability state of the healthy pod from standby to active and reassigning the label indicating the high-availability state of the failed pod from active to standby. The method may further comprise, when the label indicating the high-availability state of the failed pod has a value indicative of a standby state, assigning, step 406, the label indicating the high-availability state of the healthy pod previously without a label indicating the high-availability state to standby and to remove the role label from the failed pod.

In the method, a pod having a label indicating the high-availability state having a value indicative or an active state is an active pod, a pod having a label indicating the high-availability state having a value indicative of a standby state is a standby pod and a pod having an empty label or no label indicating the high-availability state is a spare pod. When the pods are deployed by a deployment controller, each active pod periodically stores a state for each client of the service, in a dedicated storage area for each active pod, in a persistent volume (PV) that is claimed through a persistent volume claim (PVC) by a plurality of active, standby and spare pods assigned to the service. When the pods are deployed by a statefulset controller, each active pod periodically stores a state for each client of the service in a persistent volume (PV), each pod having a dedicated a PV that is claimed in its entirety by the pod through a persistent volume claim (PVC).

The method may further comprise, creating, step 407, a replication service for the active pod, the replication service being operative to replicate the state of the active pod to the standby pod. The replication service may further be operative to replicate data, related with the active pod, stored in the PV. The method may further comprise assigning, step 408, a label to the standby pod indicating a peer relationship with the active pod. When new pairs of active and standby pods are added to provide further throughput for the service, the method comprises assigning, step 409, labels to the new standby pods indicating peer relationships with the new active pods, and creating a new replication service for each new active pod added to provide further throughput for the service.

This solution allows for the automatic redirection of services to healthy pods by using and managing secondary labels reflecting the current role of pods in the configuration from an availability perspective. Since the solution is based on Kubernetes' principles, it can be integrated easily with Kubernetes. From an availability perspective it allows for failure handling at the platform (i.e. Kubernetes) level and thus it closes the gaps existing in Kubernetes when it comes to stateful microservice based applications. That is, in case of failure of the pod providing the service, the service is redirected to the healthy standby pod, which is aware of the failing active's state, and therefore is capable of resuming its service. This redirection may be significantly shorter than the restart of the failed pod of a StatefulSet. For Deployments, in addition to the service redirection, the pods are made state aware as well.

The solution may also be more suitable for the containerization of applications that are already stateful.

The above discussed solution integrates the concept of HA state (i.e. active, standby and spare) with Kubernetes to improve the availability of stateful microservice based applications.

A State Controller component is added to Kubernetes, which manages the assignment of active and standby secondary labels to pods, which are deployed by a Deployment controller or a Stateful Set controller.

In addition, the service, which exposes the application's service (i.e. the application service) is also supplied with a secondary label of active. Therefore, it only selects/targets the pod that has the active label among those having the application service's label. That is, the traffic from the clients of the application consuming the application service is delivered by this service to the pod with the active secondary label. Pods that have no secondary label or have standby as secondary label receive no traffic through this service (i.e. the application service).

The State Controller monitors the pods and assigns or reassigns the active/standby labels to pods as necessary. Namely, in case the pod with the active secondary label fails, the State Controller reassigns the active secondary label to the pod currently having the standby label as such. It also assigns or reassigns the secondary standby label to a healthy spare pod or if it is healthy again to the former active pod. As a result of these reassignments, the application service with the active secondary label matches the newly assigned active pod and the clients' traffic is automatically delivered by Kubernetes to this pod.

An example is illustrated in FIG. 5. The Deployment controller 20 deploys and maintains three pods 10 with the application service label "app: myApp". The pods are exposed to clients through the service 5 which has two selector labels: the primary application service label "app: myApp" and the secondary label "role: Active". No pod meets these criteria until the State Controller 50 adds a new "role" label with the "Active" value to one of the pods (i.e. PodA 10*a*). The State Controller 50 also adds the label with "Standby" value to another pod (i.e. PodB 10*b*). The third pod (PodC 10*c*) on Node 3 11*c*, without a role label, is a spare pod.

Once the label assignment is done by the State Controller 50, the pod with the matching labels (PodA) is added to the endpoints list of the "MyService" service with the "app: myApp" and "role: Active" labels. PodA is now the active pod and provides service to the clients and periodically stores the state for each client in its own storage area within PV1. Note that PodB does not receive any requests and therefore stores nothing in the PV (same for PodC).

The State Controller 50 monitors the service state of the pods. If the service state of a pod becomes not ready and is removed from the endpoints of services by Kubernetes, the State Controller reassigns the role labels. Therefore, if, for example, PodA's service state becomes not ready, the State Controller updates the "role" label of PodB to "Active" so it is added to the endpoints list of the service. PodA is restarted by the Deployment controller and the State Controller assigns the "Standby" label to it. If it is the standby pod that fails, the State Controller assigns the standby label to the spare pod and once the failed pod is restarted, it becomes the new spare pod. Alternatively, it is also possible that the State Controller assigns the standby label while PodA is not restarted yet, in which case the State Controller sees that the standby is not ready and reassigns the standby label to PodC, and PodA becomes the spare pod. This is the same situation as if the standby pod fails.

As mentioned previously, pods deployed by a Deployment controller may store their states in a shared PV or database, in which case all pods have access to this information. In this case however, it is necessary that the pods are made aware of their relations and therefore in the proposed solution additional variables are associated with the pods. These variables are also handled by the State Controller.

Namely, an HA state variable and a peer variable can be associated with each pod. The HA state variable indicates the state assigned to the pod, i.e. active or standby, while the peer variable points to the active pod in case the current pod has the standby assignment. For the active pod, the peer variable points to the standby pod. To interpret these variables, a process can be added to each pod, or, the application can be made aware of these variables. Whenever the State Controller updates these variables, this process detects it (or the application detects it) and acts accordingly. For example, if the HA state changes from standby to active, the process uses the peer variable to retrieve the state stored by the potentially failed active pod, so that this new active pod can continue from this state.

Alternatively, a second internal service can be added to the application configuration for state replication. This service also has two labels: the same application service label as primary and the standby label as secondary. As a result, this internal replication service targets only the pod with standby secondary label. Therefore, the pod with the active label serving the clients traffic can use this internal service to write the clients' state to the pod with the standby label instead of, or in addition to, writing it to the PV. The pod receiving this state replication traffic should be able to handle this, which again could be handled by a generic process added to the pod, for example, writing the received state to the PV; or the application may handle it as appropriate.

In case of failure, similarly to the application service with the active label, the replication service with the standby secondary label matches the newly assigned standby pod and automatically delivers the state data from the active pod to this standby pod. No additional coordination is necessary.

Figure 6:
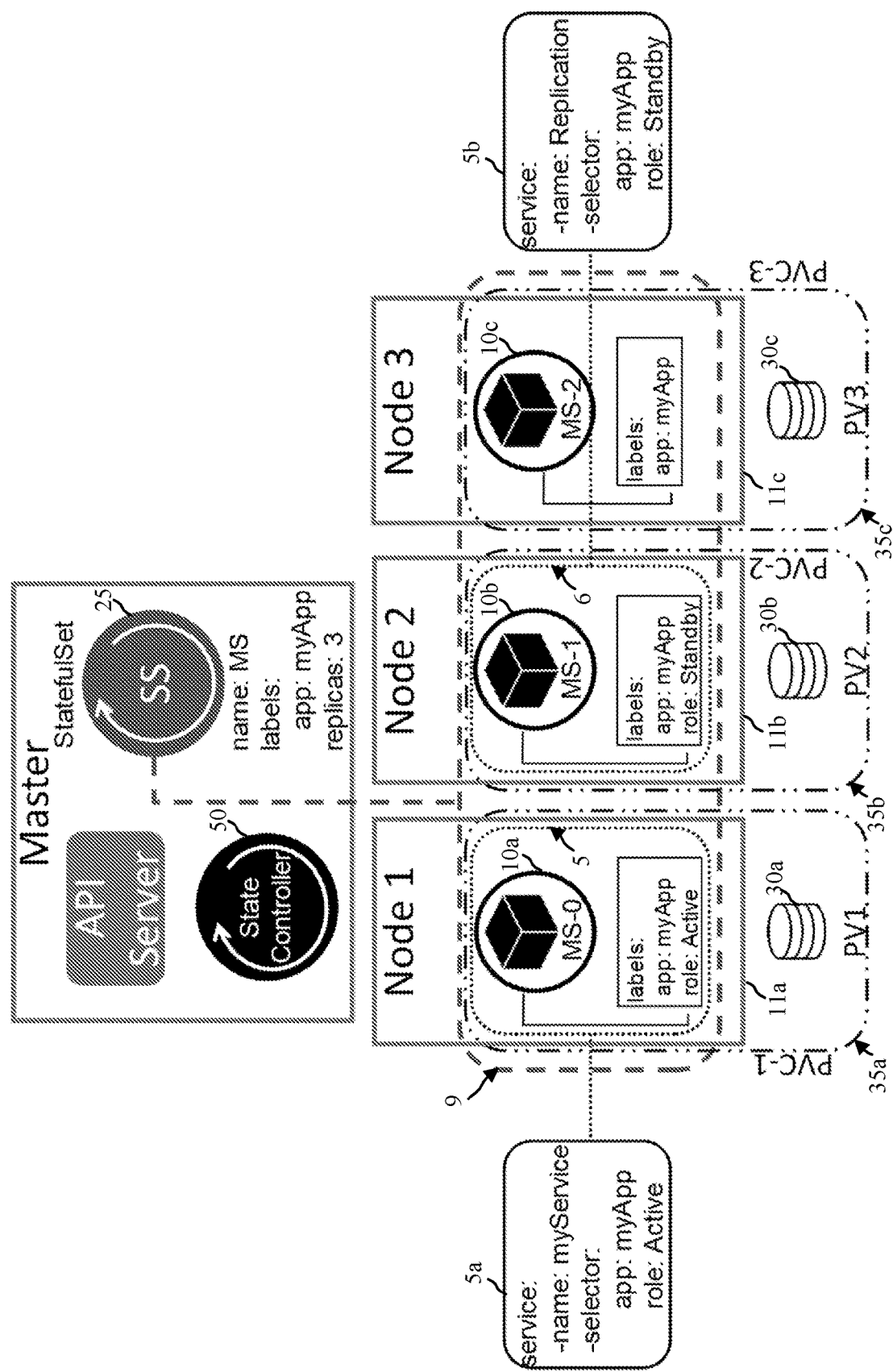
FIG. 6 is a schematic illustration of an example integrating a State Controller to manage the availability of stateful microservice based applications deployed by a Stateful Set controller.

FIG. 6 illustrates an architecture for the integration of the State Controller 50 for managing the availability of an application deployed with a StatefulSet 9. The setup of the pods and nodes is similar to FIG. 3, but in addition PVC-3 35c is created for the pod 10c on Node 3 11c, which binds the pod to the dedicated PV3 30c. The internal secondary service 5b with the name state "Replication" is also added with the two labels: "app: myApp" as primary and "role: Standby" as secondary. In this case, the pod on Node 3, is a spare pod.

In all these cases, for recovering the failed pods, the State Controller 50 relies on the Deployment controller 20 or the StatefulSet controller 25 without any modifications.

The replication service 5b will be explained in more details in relation with FIG. 7. An example, where a State Controller 50 is used, which is further able to provide elasticity, will be explained in relation with FIG. 8. For simplicity, the nodes are not shown in the examples of FIGS. 7 and 8.

As explained previously, the State Controller 50, can be used in a context where additional pods that are added to the application are considered as spares. However, the Deployment controllers (or StatefulSet controllers 25) can, and often, scale their managed applications to provide service for higher workloads. Therefore, it is important that the State Controller 50 allows having multiple active pods and therefore the State Controller should also be able to enable elasticity for stateful applications deployed with Kubernetes while managing their availability.

Figure 7:
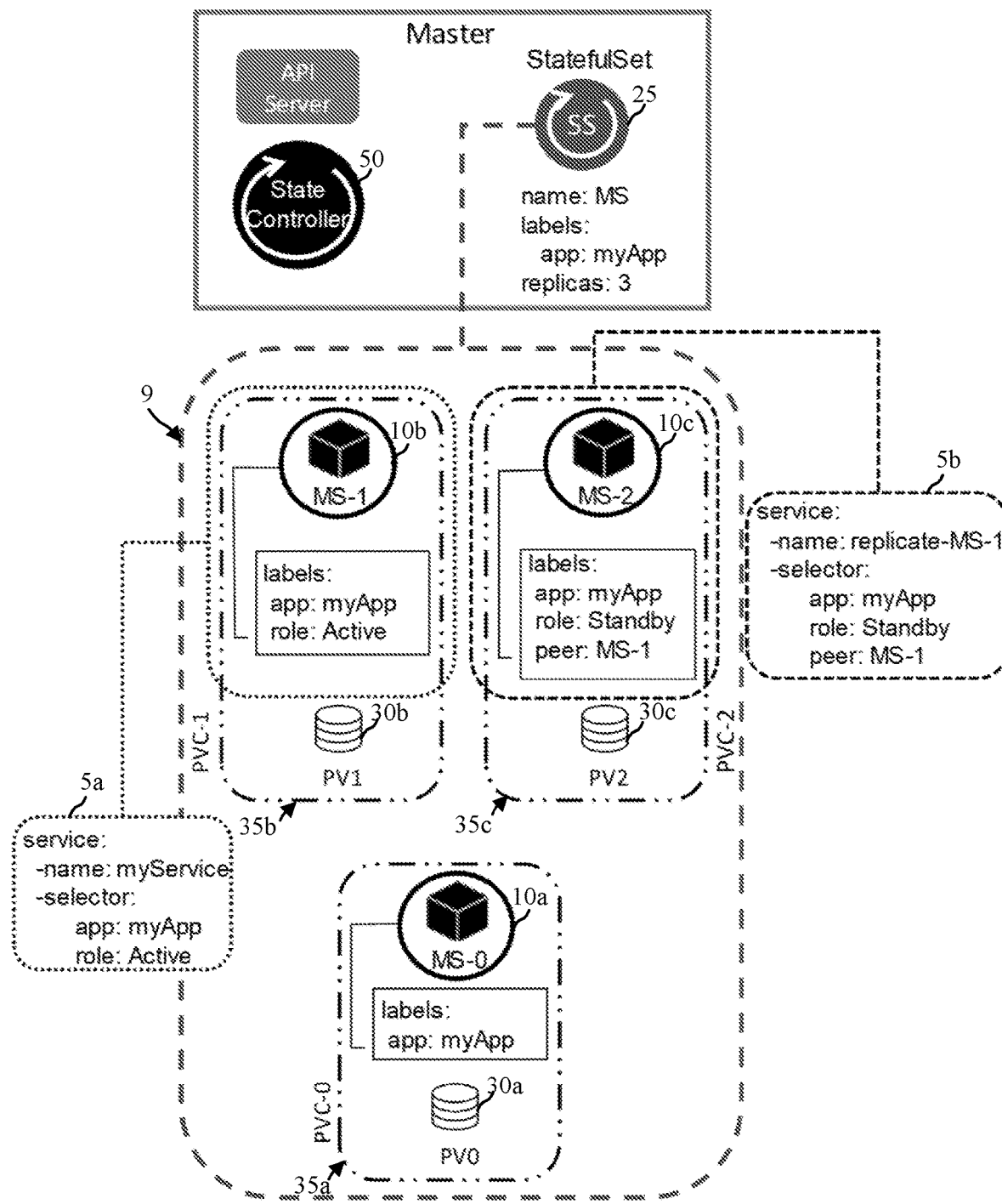
FIG. 7 is a schematic illustration of an example, in which a peer label is introduced for use with a replication service.

Turning to FIG. 7, in an initial state, let's assume there are three pods 10a, 10b and 10c maintained by the StatefulSet controller 25. The State Controller 50 is deployed and assigns the active label to pod 10b "MS-1" and the standby label to pod 10c "MS-2" 10c. Pod 10a "MS-0" 10a is the spare pod. Similar to the architecture presented in relation with FIG. 6, the application service 5a is supplied with a secondary label "role" of active and only targets the pod that has the active label.

In the example of FIG. 7, the State Controller 50 assigns an additional label to the standby pod (in this case, pod 10c) which is called the "peer" label. The peer label for the standby pod comprises the name of its corresponding active pods. In this case, the peer label of pod 10c is set to "MS-1".

Along with this, a state replication service 5b is created by the State Controller 50 for each active pod. The naming format for the state replication service may be "replicate-{active pod's name}" or any other suitable name. The state replication service 5b is created for an active pod to replicate its state to a pod whose peer label matches the name of the active pod and which has: the same application service label as the active pod, and a standby role label.

In the example of FIG. 7, the service 5b named "replicate-MS-1" is created for the active pod 10b "MS-1" and delivers the state replication requests to pod 10c "MS-2" because its role label is set to standby and its peer label is set to "MS-1". Each active pod thus replicates its own state using a service that has its own name. In the example of FIG. 7, the active pod 10c MS-1 replicates its state to the service 5b named "replicate-MS-1".

Figure 8:
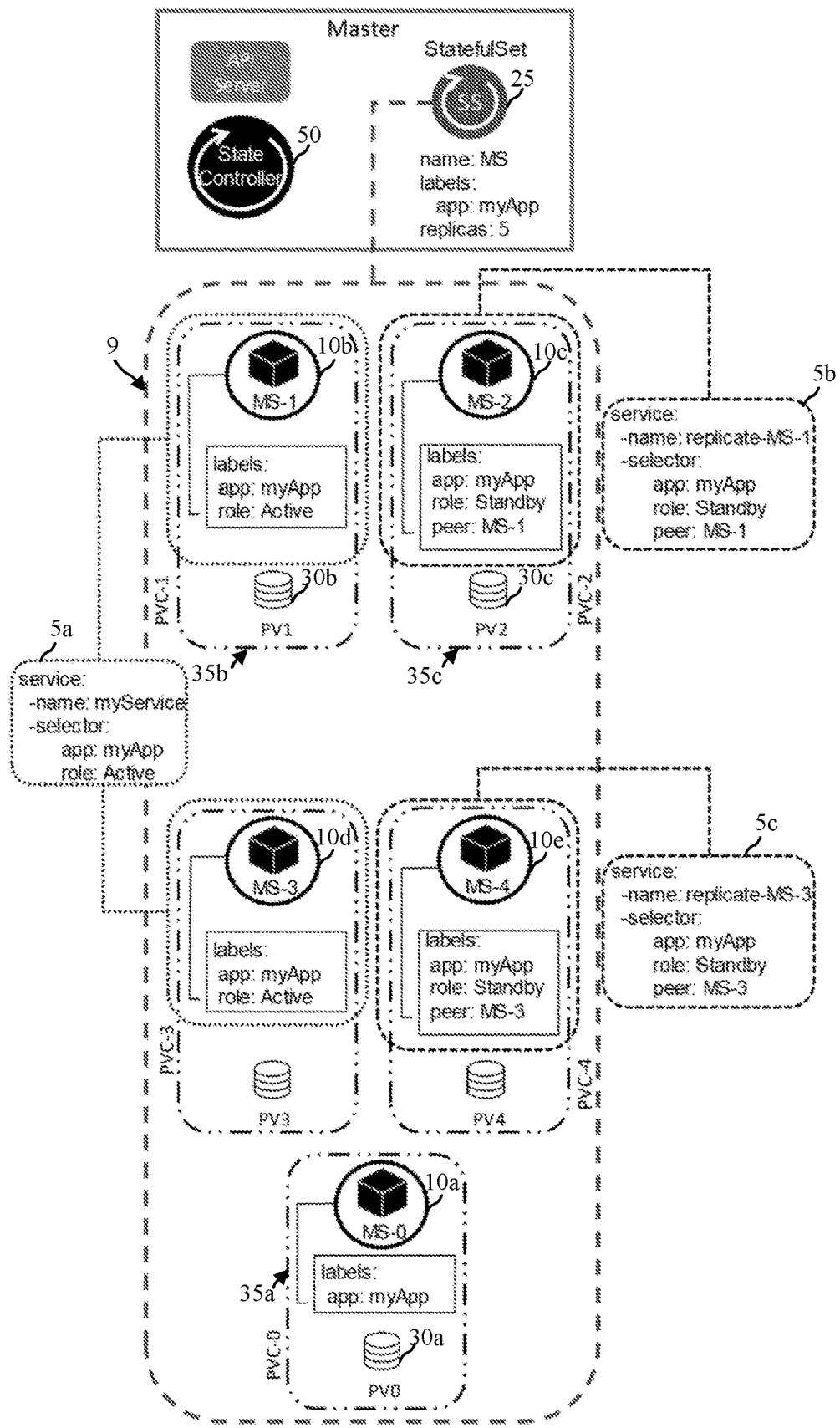
FIG. 8 is a schematic illustration of an example of a scale out scenario in which the StatefulSet controller adds two more pods to accommodate a higher workload.

FIG. 8 illustrates a scale out scenario (from FIG. 7) in which the StatefulSet controller 25 adds two more pods 10d and 10e, "MS-3" and "MS-4", e.g. to accommodate a higher workload associated with the service 5a. The State Controller 50 detects that the pods 10d and 10e are added, and assigns an active role label to pod 10d "MS-3" and a standby role label to pod 10e "MS-4". The peer label with the value of "MS-3" is added to the standby pod 10e. Moreover, a state replication service 5c named "replicate-MS-3" is created which is used by the new active pod 10d ("MS-3") to replicate its state. With this, there are two active pods 10b "MS-1" and 10d "MS-3" in the endpoints list of the application service 5a.

If the application 5a is subsequently scaled again, the State Controller 50 executes the same steps, assigning a pair of active and standby labels to the added pods, where the standby pod has the peer label referring to the active pod. It should be noted that the State Controllers 50 (there could be many of those) could be integrated similarly with Deployment controllers 20.

The failures of active pods are handled in a manner similar to what was explained previously. For example, if pod 10d "MS-3" fails, the State Controller 50 that is monitoring the service state of the pods detects that the status of pod 10d "MS-3" has changed from ready to not ready and changes the role label of pod 10e "MS-4" to active and deletes the peer label "MS-3". The State Controller 50 also changes the role label of pod 10d "MS-3" to standby, assuming it has been restarted after the failure, and adds a peer label with the value "MS-4" to pod 10d. Moreover, the "replicate-MS-3" service is deleted, and, instead, another service named "replicate-MS-4" is created which send the requests to "MS-3". The "MS-4" replicates its state data to "MS-3" by using the "replicate-MS-4" service. If pod 10d "MS-3" is not ready yet when the State Controller 50 tries to change its role label to standby, then the State Controller 50 uses pod 10a "MS-0" for the standby role and remove the role label from 10d "MS-3". In this case 10d "MS-3" becomes a spare pod when it is eventually restarted.

It should be noted that label names provided herein are provided as example names only and that other suitable names could be used interchangeably depending on system configurations.

Referring again to FIGS. 1-3 and 5-8, the state controller 50, running in a Kubernetes system, is operative to assign labels to pods, the labels indicating services to which the pods are assigned and high-availability states of the pods; detect a failed pod having a label indicating a high-availability state of not ready; and reassign the label indicating the high-availability state of the failed pod to a healthy pod, thereby changing endpoints of services provided and service flows from the failed pod to the healthy pod.

The state controller is further operative to continuously monitor the pods state to detect failed pods. When the label indicating the high-availability state of the failed pod has a value indicative of an active state, the state controller is further operative to reassign the label indicating the high-availability state of the healthy pod from standby to active and to reassign the label indicating the high-availability state of the failed pod from active to standby. When the label indicating the high-availability state of the failed pod has a value indicative of a standby state, the state controller is further operative to assign the label indicating the high-availability state of the healthy pod previously without a label indicating the high-availability state to standby and to remove the role label from the failed pod.

A pod having a label indicating the high-availability state having a value indicative of an active state is an active pod, a pod having a label indicating the high-availability state having a value indicative of a standby state is a standby pod and a pod having an empty label or no label indicating the high-availability state is a spare pod. When the pods are deployed by a deployment controller, each active pod periodically stores a state for each client of the service, in a dedicated storage area for each active pod, in a persistent volume (PV) that is claimed through a persistent volume claim (PVC) by a plurality of active, standby and spare pods assigned to the service. When the pods are deployed by a statefulset controller, each active pod periodically stores a state for each client of the service in a persistent volume (PV), each pod having a dedicated a PV that is claimed in its entirety by the pod through a persistent volume claim (PVC).

The state controller is further operative to create a replication service for the active pod, the replication service being operative to replicate the state of the active pod to the standby pod. The replication service may further be operative to replicate data, related with the active pod, stored in the PV. The state controller is further operative to assign a label to the standby pod indicating a peer relationship with the active pod. When new pairs of active and standby pods are added to provide further throughput for the service, the state controller is further operative to assign labels to the new standby pods indicating peer relationships with the new active pods, and to create a new replication service for each new active pod added to provide further throughput for the service.

Figure 9:
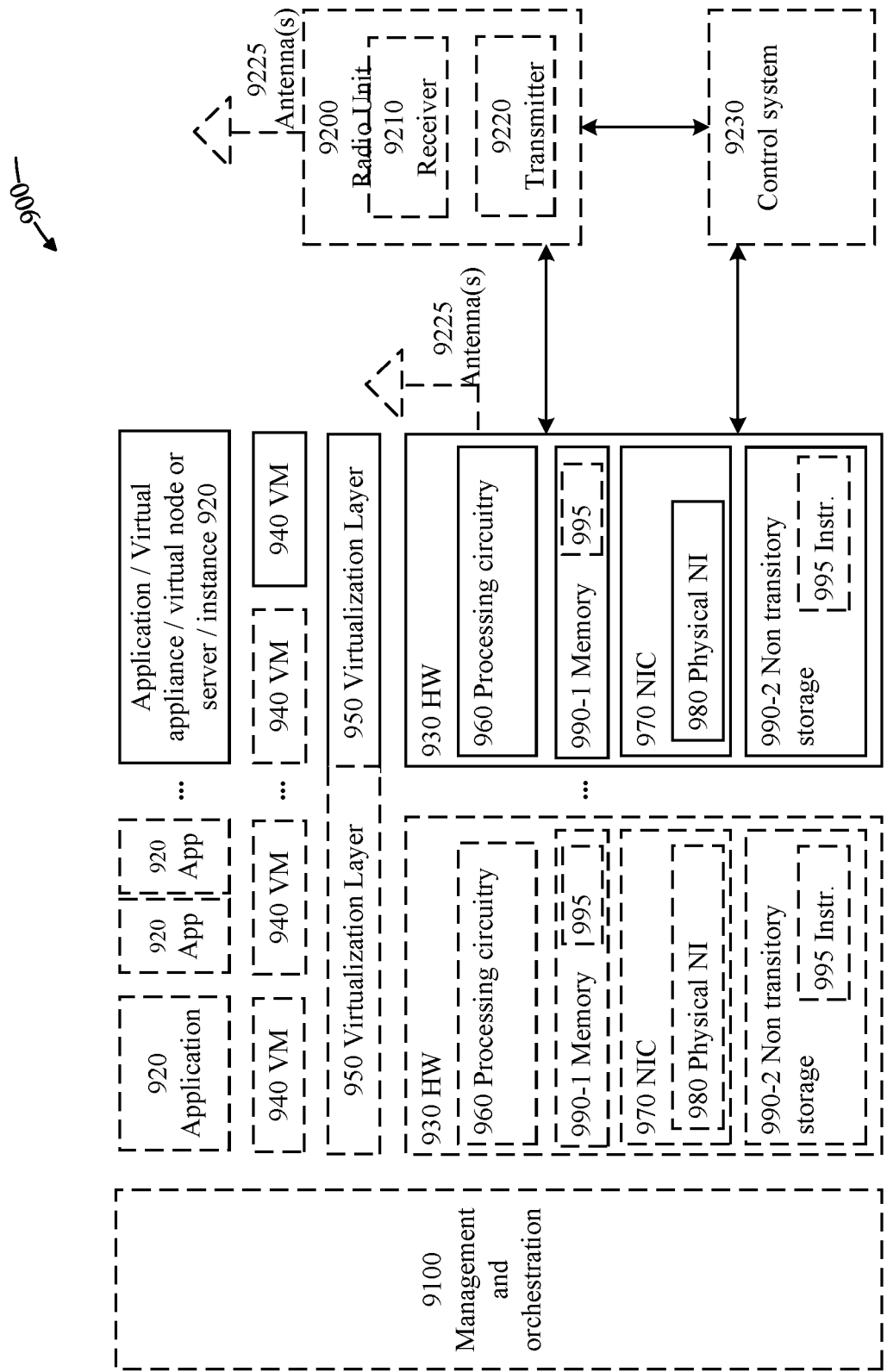
FIG. 9 is a schematic illustration of a virtualization environment in which embodiments can be deployed.

FIG. 9 is a schematic block diagram illustrating a virtualization environment 900 in which functions implemented by some embodiments may be virtualized. As used herein, virtualization can be applied to a node (e.g., a virtualized base station or a virtualized radio access node) or to a device (e.g., a UE, a wireless device or any other type of communication device) and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines or containers implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement steps of some methods according to some embodiments. Applications 920 run in virtualization environment 900 which provides hardware 930 comprising processing circuitry 960 and memory 990. Memory 990 contains instructions 995 executable by processing circuitry 960 whereby application 920 is operative to provide any of the relevant features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by the processing circuitry 960. Each hardware devices may comprise one or more network interface controllers 970 (NICs), also known as network interface cards, which include physical network interface 980. Each hardware devices may also include non-transitory, persistent, machine readable storage media 990-2 having stored therein software 995 and/or instruction executable by processing circuitry 960. Software 995 may include any type of software including software for instantiating one or more virtualization layers 950 (also referred to as hypervisors), software to execute virtual machines 940 or containers as well as software allowing to execute functions described in relation with some embodiments described herein.

Virtual machines 940 or containers, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940 or containers, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940 or to a container.

As shown in FIG. 9, hardware 930 may be a standalone network node, with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a virtual machine 940 or container is a software implementation of a physical machine that runs programs as if they were executing on a physical, non-virtualized machine. Each of virtual machines 940 or container, and that part of the hardware 930 that executes that virtual machine, be it hardware dedicated to that virtual machine and/or hardware shared by that virtual machine with others of the virtual machines 940 or containers, forms a separate virtual network elements (VNE).

Still in the context of NFV, Virtual Network Function (VNF) is responsible for handling specific network functions that run in one or more virtual machines 940 or containers on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signaling can be effected with the use of control system 9230 which may alternatively be used for communication between the hardware nodes 930 and the radio units 9200.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A state controller running in a Kubernetes system, the state controller being operative to:
    assign labels to pods, the labels indicating services to which the pods are assigned and high-availability states of the pods;
    detect a failed pod having a label indicating a high-availability state of not ready; and
    reassign the label indicating the high-availability state of the failed pod to a healthy pod, thereby changing endpoints of services provided and service flows from the failed pod to the healthy pod.

2. The state controller of claim 1, further operative to continuously monitor the pods state to detect failed pods.

3. The state controller of claim 1, wherein, when the label indicating the high-availability state of the failed pod has a value indicative of an active state, the state controller is further operative to reassign the label indicating the high-availability state of the healthy pod from standby to active and to reassign the label indicating the high-availability state of the failed pod from active to standby.

4. The state controller of claim 1, wherein, when the label indicating the high-availability state of the failed pod has a value indicative of a standby state, the state controller is further operative to assign the label indicating the high-availability state of the healthy pod previously without a label indicating the high-availability state to standby and to remove the label from the failed pod.

5. The state controller of claim 3, wherein a pod having a label indicating the high-availability state having a value indicative of an active state is an active pod, a pod having a label indicating the high-availability state having a value indicative of a standby state is a standby pod and a pod having an empty label or no label indicating the high-availability state is a spare pod.

6. The state controller of claim 5, wherein, when the active, standby and spare pods are deployed by a deployment controller, each active pod periodically stores a state for each client of the service, in a dedicated storage area for each active pod, in a persistent volume (PV) that is claimed through a persistent volume claim (PVC) by a plurality of active pods, a plurality of standby pods and a plurality of spare pods assigned to the service.

7. The state controller of claim 5, wherein, when the active, standby and spare pods are deployed by a statefulset controller, each active pod periodically stores a state for each client of the service in a persistent volume (PV), each pod having a dedicated a PV that is claimed in its entirety by the pod through a persistent volume claim (PVC).

8. The state controller of claim 6, further operative to create a replication service for the active pod, the replication service being operative to replicate the state of the active pod to the standby pod.

9. The state controller of claim 8 wherein the replication service is further operative to replicate data, related with the active pod, stored in the PV.

10. The state controller of claim 8, further operative to assign a label to the standby pod indicating a peer relationship with the active pod.

11. The state controller of claim 8, wherein, upon detecting that new pairs of active and standby pods are added to provide further throughput for the service, the state controller is further operative to assign labels to the new standby pods indicating peer relationships with the new active pods, and to create a new replication service for each new active pod added to provide further throughput for the service.

12. A method for operating a state controller, comprising:
    assigning labels to pods, the labels indicating services to which the pods are assigned and high-availability states of the pods;
    detecting a failed pod having a label indicating a high-availability state of not ready; and
    reassigning the label indicating the high-availability state of the failed pod to a healthy pod, thereby changing endpoints of services provided and service flows from the failed pod to the healthy pod.

13. The method of claim 12, further comprising continuously monitoring the pods state to detect failed pods.

14. The method of claim 12, further comprising, upon detecting that the label indicating the high-availability state of the failed pod has a value indicative of an active state, reassigning the label indicating the high-availability state of the healthy pod from standby to active and to reassign the label indicating the high-availability state of the failed pod from active to standby.

15. The method of claim 12, further comprising, upon detecting that the label indicating the high-availability state of the failed pod has a value indicative of a standby state, assigning the label indicating the high-availability state of the healthy pod previously without a label indicating the high-availability state to standby and to remove the label from the failed pod.

16. The method of claim 14, wherein a pod having a label indicating the high-availability state having a value indicative of an active state is an active pod, a pod having a label indicating the high-availability state having a value indicative of a standby state is a standby pod and a pod having an empty label or no label indicating the high-availability state is a spare pod.

17. The method of claim 16, wherein, upon detecting that the active, standby and spare pods are deployed by a deployment controller, each active pod periodically stores a state for each client of the service, in a dedicated storage area for each active pod, in a persistent volume (PV) that is claimed through a persistent volume claim (PVC) by a plurality of active pods, a plurality of standby pods and a plurality of spare pods assigned to the service.

18. The method of claim 16, wherein, upon detecting that the active, standby and spare pods are deployed by a statefulset controller, each active pod periodically stores a state for each client of the service in a persistent volume (PV), each pod having a dedicated a PV that is claimed in its entirety by the pod through a persistent volume claim (PVC).

19. The method of claim 17, further comprising, creating a replication service for the active pod, the replication service being operative to replicate the state of the active pod to the standby pod.

20. The method of claim 19, wherein the replication service is further operative to replicate data, related with the active pod, stored in the PV.

21. The method of claim 19, further comprising assigning a label to the standby pod indicating a peer relationship with the active pod.

22. The method of claim 19, wherein, upon detecting that new pairs of active and standby pods are added to provide further throughput for the service, assigning labels to the new standby pods indicating peer relationships with the new active pods, and creating a new replication service for each new active pod added to provide further throughput for the service.

23. A non-transitory computer readable media having stored thereon instructions for operating a state controller, said instructions comprising:
  assigning labels to pods, the labels indicating services to which the pods are assigned and high-availability states of the pods;
  detecting a failed pod having a label indicating a high-availability state of not ready; and
  reassigning the label indicating the high-availability state of the failed pod to a healthy pod, thereby changing endpoints of services provided and service flows from the failed pod to the healthy pod.

* * * * *